US009255351B2

(12) United States Patent
Menczywor

(10) Patent No.: US 9,255,351 B2
(45) Date of Patent: Feb. 9, 2016

(54) KNITTING WITH YARNS OF DIFFERING STRETCH PROPERTIES

(75) Inventor: Denis John Menczywor, Derry, NH (US)

(73) Assignee: Velcro Industries B.V., Willemstad (CW)

(*) Notice: Subject to any disclaimer, the term of this patent is extended or adjusted under 35 U.S.C. 154(b) by 987 days.

(21) Appl. No.: 13/295,468

(22) Filed: Nov. 14, 2011

(65) Prior Publication Data
US 2012/0122364 A1 May 17, 2012

Related U.S. Application Data

(60) Provisional application No. 61/414,322, filed on Nov. 16, 2010.

(51) Int. Cl.
*D04B 1/18* (2006.01)
*B32B 5/02* (2006.01)
(Continued)

(52) U.S. Cl.
CPC . *D04B 1/18* (2013.01); *B32B 5/026* (2013.01); *B32B 5/08* (2013.01); *B32B 5/12* (2013.01); *B32B 5/26* (2013.01); *D04B 1/04* (2013.01); *D04B 9/12* (2013.01); *D04B 15/80* (2013.01);
(Continued)

(58) Field of Classification Search
CPC ........ D04B 15/48; D04B 15/50; D04B 15/58; D04B 15/54; D04B 1/18; D04B 1/04
USPC ................................ 66/136, 137, 131, 125 B
See application file for complete search history.

(56) References Cited

U.S. PATENT DOCUMENTS 715,457 A * 12/1902 Burson ........................... 66/202
1,661,427 A * 3/1928 Houseman .................. 66/108 R
(Continued)

FOREIGN PATENT DOCUMENTS

EP 604731 A1 7/1994
EP 1052319 A1 11/2000
(Continued)

OTHER PUBLICATIONS

Maliwatt "Stitch-Bonding Machines for Nonwoven-Processing" Brochure by Karl Mayer, published 2007 (8 pages).; Bruen, Shanna M., et al.; "Three-Dimensionally Knit Spacer Fabrics: A Review of Production Techniques and Applications;" Journal of Textile and Apparel, Technology and Management, vol. 4, Issue 4, Summer 2005; 31 pages.
(Continued)

*Primary Examiner* — Danny Worrell
(74) *Attorney, Agent, or Firm* — Fish & Richardson P.C.

(57) ABSTRACT

A method of forming a circular knit fabric includes feeding a multi-filament non-elastomeric yarn from a first spool into an aperture defined in a yarn carrier plate that guides the non-elastomeric yarn sequentially to a series of knitting needles spaced about a circular needle array; while feeding an elastomeric yarn from a second spool to the yarn carrier plate, such that a fabric is knit to have a ground comprising both the non-elastomeric yarn and the elastomeric yarn. The non-elastomeric yarn and the elastomeric yarn are fed together into the carrier plate aperture in an untwisted, unwrapped relation, such that the fabric ground is knit to have a technical face in which portions of the non-elastomeric yarn are exposed in some areas and portions of the elastomeric yarn are exposed in some areas.

9 Claims, 8 Drawing Sheets

(51) Int. Cl.
*B32B 5/08* (2006.01)
*B32B 5/12* (2006.01)
*B32B 5/26* (2006.01)
*D04B 1/04* (2006.01)
*D04B 15/80* (2006.01)
*D04B 9/12* (2006.01)

(52) U.S. Cl.
CPC ......... *B32B 2255/02* (2013.01); *B32B 2255/28* (2013.01); *B32B 2262/02* (2013.01); *D10B 2501/0632* (2013.01); *Y10T 442/413* (2015.04); *Y10T 442/488* (2015.04)

(56) References Cited

U.S. PATENT DOCUMENTS

| | | | | |
|---|---|---|---|---|
| 1,666,056 | A | * | 4/1928 | Epps ................................. 66/137 |
| 1,680,063 | A | * | 8/1928 | Page ................................. 66/40 |
| 1,838,994 | A | * | 12/1931 | Houseman ........................ 66/36 |
| 2,001,653 | A | * | 5/1935 | Booton et al. ..................... 66/90 |
| 2,832,125 | A | * | 4/1958 | Knohl ............................... 2/239 |
| 2,934,923 | A | * | 5/1960 | Elwell ............................... 66/188 |
| 3,403,537 | A | * | 10/1968 | Bharat ............................. 66/195 |
| 3,705,065 | A | | 12/1972 | Stumpf |
| 3,757,537 | A | * | 9/1973 | York ................................. 66/9 R |
| 3,800,564 | A | * | 4/1974 | Carswell .......................... 66/136 |
| 3,822,162 | A | | 7/1974 | Stumpf |
| 3,861,176 | A | * | 1/1975 | McWhirter et al. ............ 66/137 |
| 4,062,204 | A | * | 12/1977 | Segundo et al. ................ 66/196 |
| 4,137,615 | A | * | 2/1979 | Webster .......................... 28/218 |
| 4,875,241 | A | * | 10/1989 | Browder et al. .................. 2/409 |
| 5,139,479 | A | | 8/1992 | Peters |
| 5,198,288 | A | * | 3/1993 | Grunfeld ....................... 442/306 |
| 5,256,231 | A | | 10/1993 | Gorman et al. |
| 5,326,612 | A | | 7/1994 | Goulait |
| 5,547,531 | A | | 8/1996 | Allen et al. |
| 5,554,239 | A | | 9/1996 | Datta et al. |
| 5,615,460 | A | | 4/1997 | Weirich et al. |
| 5,687,587 | A | * | 11/1997 | Michel ............................ 66/196 |
| 5,738,937 | A | | 4/1998 | Baychar |
| 5,763,041 | A | | 6/1998 | Leak et al. |
| 5,817,391 | A | | 10/1998 | Rock et al. |
| 5,931,023 | A | * | 8/1999 | Brach et al. ..................... 66/136 |
| 5,979,193 | A | * | 11/1999 | Murata ....................... 66/169 R |
| 6,182,475 | B1 | * | 2/2001 | Lee ................................. 66/136 |
| 6,263,707 | B1 | * | 7/2001 | Miller et al. .................... 66/171 |
| 6,329,016 | B1 | | 12/2001 | Shepard et al. |
| 6,370,922 | B1 | * | 4/2002 | Brach et al. ..................... 66/136 |
| 6,386,003 | B1 | * | 5/2002 | Wang .............................. 66/136 |
| 6,494,207 | B1 | | 12/2002 | Kwok |
| 6,582,382 | B2 | | 6/2003 | Domanski et al. |
| 6,776,014 | B1 | * | 8/2004 | Laycock et al. ................. 66/198 |
| 6,869,659 | B2 | | 3/2005 | Shepard et al. |
| 6,918,236 | B2 | | 7/2005 | Springs |
| 6,929,617 | B2 | | 8/2005 | McCormick et al. |
| 6,959,565 | B2 | * | 11/2005 | Furuya ............................ 66/202 |
| 6,981,341 | B2 | | 1/2006 | Baychar |
| 7,040,124 | B1 | * | 5/2006 | Miller et al. .................... 66/202 |
| 7,117,695 | B2 | * | 10/2006 | Laycock et al. ................. 66/198 |
| 7,282,251 | B2 | | 10/2007 | Provost et al. |
| 7,303,808 | B2 | | 12/2007 | Taneichi et al. |
| 7,634,924 | B2 | * | 12/2009 | Chuang et al. .................. 66/198 |
| 7,654,114 | B2 | * | 2/2010 | Xu ............................... 66/126 A |
| 7,779,655 | B2 | * | 8/2010 | Chuang et al. .................. 66/198 |
| 7,797,968 | B2 | * | 9/2010 | Chuang et al. .................. 66/198 |
| 2004/0167456 | A1 | | 8/2004 | Kingsford et al. |
| 2005/0196583 | A1 | | 9/2005 | Provost et al. |
| 2005/0208260 | A1 | | 9/2005 | Baldauf |
| 2008/0072629 | A1 | | 3/2008 | Gehring |
| 2008/0082076 | A1 | | 4/2008 | Kingsford et al. |
| 2008/0305297 | A1 | | 12/2008 | Barker et al. |
| 2009/0203280 | A9 | | 8/2009 | Provost et al. |
| 2010/0247846 | A1 | * | 9/2010 | Erickson ......................... 428/99 |

FOREIGN PATENT DOCUMENTS

| | | |
|---|---|---|
| EP | 1444093 A1 | 8/2004 |
| EP | 1638500 A1 | 3/2006 |
| EP | 1561441 B1 | 12/2008 |
| FR | 2801614 B3 | 11/2001 |
| WO | WO9410946 A1 | 5/1994 |
| WO | WO2006107844 A1 | 10/2006 |

OTHER PUBLICATIONS

Bruen, Shanna M., et al.; "Three-Dimensionally Knit Spacer Fabrics: A Review of Production Techniques and Applications;" Journal of Textile and Apparel, Technology and Management, vol. 4, Issue 4, Summer 2005; 31 pages.

* cited by examiner

———— 42
—·—·— 40
—--—--— 44

KNITTING WITH YARNS OF DIFFERING STRETCH PROPERTIES

RELATED APPLICATIONS

This U.S. Patent Application claims priority under 35 U.S.C. §120 from U.S. Patent Application 61/414,322, filed on Nov. 16, 2010. The disclosure of this prior application is considered part of the disclosure of this application and is hereby incorporated herein by reference in its entirety.

TECHNICAL FIELD

This invention relates to knitting fabrics from yarns of differing stretch properties, such as from both elastomeric and non-elastomeric yarns, and the fabrics produced thereby.

BACKGROUND

Single-knit jersey fabrics are generally inexpensive and found in such things as underwear and T-shirts. Due to their interconnected loop structure, knit materials in general can be deformed or stretched by elongating individual stitches, even when the fabric is knit of yarns made of non-elastomeric fiber materials. To provide a greater degree of stretch and stretch recovery, elastomeric yarns may be knit into a fabric. One type of elastomeric yarn in common use is spandex. Spandex, sometimes sold under the trade name LYCRA®, is a manufactured fiber of a long-chain synthetic polymer containing at least 85 percent segmented polyurethane. The polyurethane is prepared from a polyether glycol, a mixture of diisocyanates, and a chain extender and then melt-spun, dry-spun or wet-spun to form the spandex fiber. Another type of elastomeric yarn is polybutylene-terephtalate (PBT) yarn, a highly elastic, friction-texturized polyester yarn available from Swicofil AG Textile Services of Emmenbruecke, Switzerland.

Knitting spandex yarns together with non-elastomeric yarns in a jersey knitting process is sometimes referred to as "plaiting" or "plating," in which the non-elastomeric yarn and the bare spandex yarn are kept in a parallel, side-by-side relation throughout the knit, with the relation between the two yarns controlled such that the spandex material is always kept on one side of the non-elastomeric yarn. In plush or pile materials, the spandex yarn is generally kept away from the technical face of the fabric (i.e., the side opposite the raised pile), so as to present the typically more attractive and comfortable non-elastomeric yarn material at the technical face and to protect the spandex yarn fibers from snagging. Spandex yarns may also accept dye differently than other yarn materials, resulting in unacceptable color variations if exposed on the fabric surface. Stretchable pile fabrics may be made in a three end knitting process, meaning that three separate yarns are brought into the machine and knit together to form the fabric: a non-elastomeric ground yarn, an elastomeric ground yarn, and a pile yarn. As knit, the non-elastomeric and elastomeric ground yarns are generally limited to the ground of the fabric, and the pile yarns extend out of the fabric to form discrete loops, which in some cases are cut or shaved after processing to form a bed of fiber ends. The non-elastomeric and elastomeric ground yarns may be plated to keep the elastomeric yarns away from the technical fabric face while being knit into the fabric, or may be "laid in" or tucked into the knit structure using needle selection cams, to trap the elastomeric yarns between the non-elastomeric ground and pile yarns.

Some knit materials are formed as circular knit materials, meaning that they are initially knit as a tube on a machine in which the knitting needles are organized into a circular knitting bed. The needles are sequentially activated about the circular bed, such as by a cam surface acting against butt ends of the rotating set of needles, to lift and accept a yarn fed from a spool into a yarn carrier plate, to form a spiral row of stitches about the end of the tube. Such a process is also referred to as circular weft knitting. To circular knit a three end stretchable plush or pile fabric, the non-elastomeric ground yarn, the elastomeric ground yarn and the pile yarn are each fed separately to respective holes or slots in the carrier plate. In particular, the elastomeric yarn is kept separate from the non-elastomeric ground yarn until the point of introduction to the needles, so as to maintain the strict positional relation of non-elastomeric and elastomeric yarns, in order to keep the spandex material from being exposed, or "grinning through" the technical face of the fabric. In some cases, such as on some Orizio machines made by Orizio SRL, Brescia, Italy, the elastomeric yarn is run outside of the carrier plate, and guided into the needle before it closes by an outside guide roll. Circular knitting machines are also available from Vanguard Supreme, a division of the Monarch Knitting Machinery Corporation, in Monroe, N.C.

Improvements in stretchable laminate constructions and methods of making them will hopefully result in further advances in comfort and usefulness, as well as in reductions in costs.

SUMMARY

One aspect of the invention features a method of forming a circular knit fabric. The method includes feeding a multi-filament non-elastomeric yarn from a first spool into an aperture defined in a yarn carrier plate that guides the non-elastomeric yarn sequentially to a series of knitting needles spaced about a circular needle array, while feeding an elastomeric yarn from a second spool to the yarn carrier plate, such that a fabric is knit to have a ground comprising both the non-elastomeric yarn and the elastomeric yarn. The non-elastomeric yarn and the elastomeric yarn are fed together into the carrier plate aperture in an untwisted, unwrapped relation, such that the fabric ground is knit to have a technical face in which portions of the non-elastomeric yarn are exposed in some areas and portions of the elastomeric yarn are exposed in some areas.

In some embodiments, the method also includes feeding a pile yarn from a third spool into a pile yarn aperture defined in the carrier plate, such that the pile yarn is delivered to the knitting needles to form a pile extending from a technical back of the knit fabric.

In some examples the non-elastomeric yarn is a texturized yarn.

In some cases, the elastomeric yarn is a non-wrapped yarn.

Some examples of the method also include applying a stretchable binder to the knit fabric ground, and/or adhesively laminating the technical face of the knit ground of the fabric to a technical face of another fabric. The other fabric may also have a technical face at which elastomeric yarn is present.

Adhesively laminating the technical face of the knit ground may include applying a stretchable acrylic adhesive to the technical face of the knit ground. Preferably, the adhesive is applied to cover no more than about 70 percent of an area of the knit ground.

Another aspect of the invention features a circular knit fabric with a knit ground formed at least in part of an elastomeric yarn and a non-elastomeric yarn, with the elastomeric and non-elastomeric yarns following a common path through the ground. A pile is formed of at least one pile yarn knit with the ground and extends from a side of the fabric opposite a technical face. Both the elastomeric yarn and the non-elastomeric yarn of the knit ground are present on the technical face of the knit fabric, with the technical face including some areas of multiple adjacent stitches in which the elastomeric yarn covers the non-elastomeric yarn, and other areas of multiple adjacent stitches in which the non-elastomeric yarn covers the elastomeric yarn.

In some examples the non-elastomeric yarn is a texturized yarn, and/or the elastomeric yarn is non-wrapped yarn.

In some embodiments, the knit ground includes a binder, such as an elastomeric binder, disposed within the ground.

Another aspect of the invention features a stretchable fabric laminate of two of the circular knit fabrics described herein, adhesively laminated with their technical faces in face-to-face relation, with some of the areas of multiple adjacent stitches of one of the fabrics in which the elastomeric yarn covers the non-elastomeric yarn directly adhesively bonded to some of the areas of multiple adjacent stitches of the other of the fabrics in which the elastomeric yarn covers the non-elastomeric yarn, such that the elastomeric yarn of the knit ground of one of the fabrics is directly adhesively bonded to elastomeric yarn of the knit ground of the other of the fabrics.

In some examples of the laminate, one of the knit fabrics is relatively more hydrophilic than the other knit fabric.

Various examples of the proposed fabrics and methods described herein can provide particularly useful fabric properties, particularly in inexpensively providing a knit fabric with a technical face at which both elastomeric and non-elastomeric yarns are present. Lamination of such knit fabrics can be facilitated by having elastomeric as well as non-elastomeric yarns present on technical faces that are bonded together.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
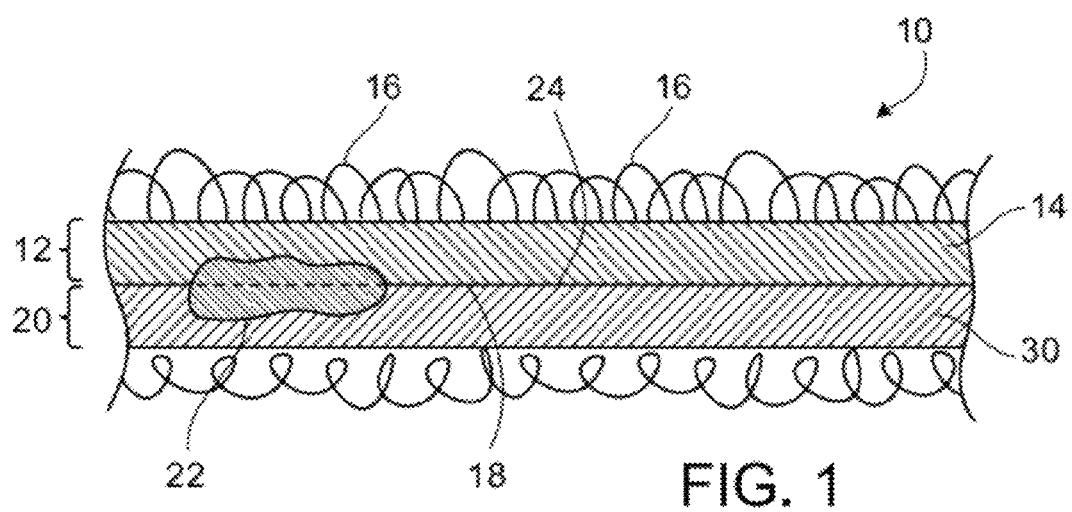
FIG. 1 is a schematic illustration of a fabric laminate material, in side cross-sectional view.

Referring first to FIG. 1, a flexible, breathable fabric laminate 10 includes a first stretchable fabric layer 12 in the form of a knit fabric 14 that has ground yarns and pile yarns forming hook-engageable fiber loops 16 exposed on an outer surface of the fabric laminate, and a second stretchable fabric layer 20 in the form of a second knit fabric 30 having a technical face 24 bonded directly to the technical face 18 of the first fabric layer 12 by an adhesive 22. As will be discussed further below, elastomeric yarns are included in the ground yarns of both of the knit fabrics, so as to make each fabric elastically stretchable.

Both knit fabrics 14, 30 may be jersey pile knits that are knit to have sections of pile fibers present on technical faces 18, 24 along with at least some elastomeric ground yarns. Either or both fabrics may be circular knit fabrics. The adhesive 22 is arranged in discrete regions that together cover no more than about 70 percent of either fabric layer, leaving adhesive-free areas of the laminate 10. Adhesive 22 is in contact with both portions of the pile yarns and portions of the elastomeric ground yarns of each fabric at their respective technical faces.

Figure 2:
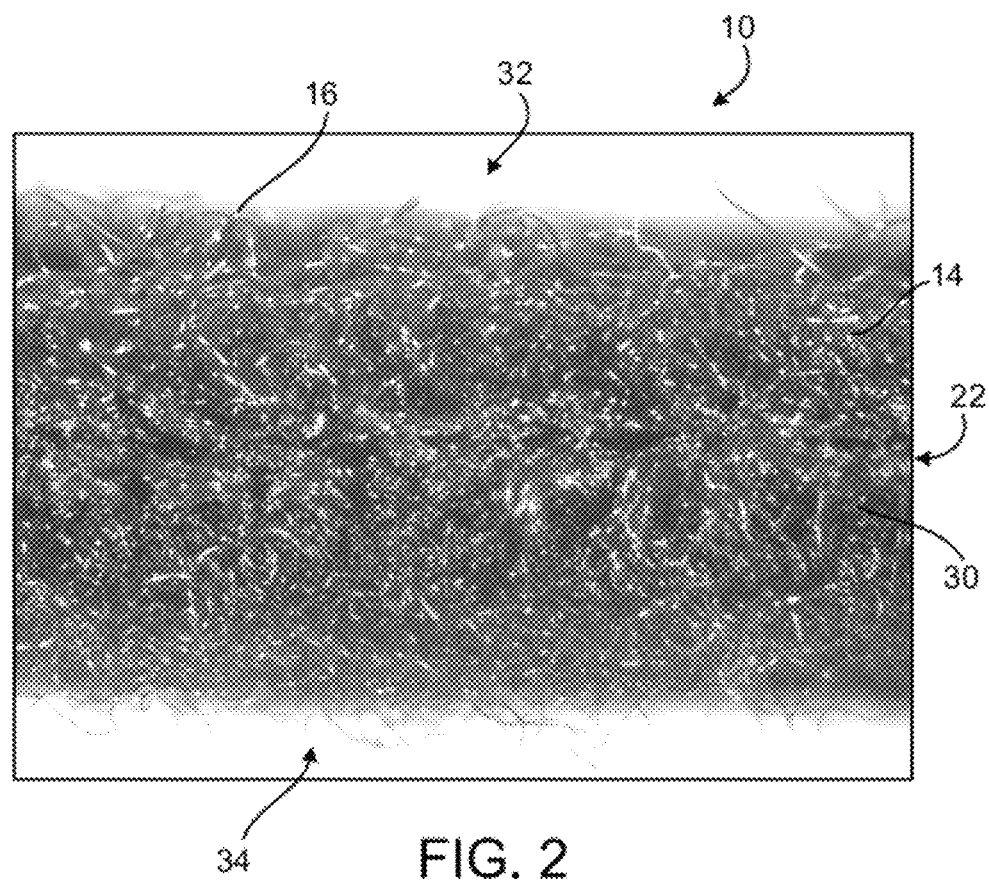
FIG. 2 is an enlarged photograph of a fabric laminate material, in side view.

Referring also to FIG. 2, the laminate 10 has an overall thickness, as measured in accordance with ASTM D1777 Section 7, Volume 7.01, with a thickness gauge modified for loop textiles with a two-inch (50 mm) diameter foot and a contact force of 31+/−3 grams, supplied by B C Ames Inc, of Melrose, Mass., USA, as Model no ABD-2600N DIG. IND, as per drawing number 07-0113, of about 0.095 inch (2.4 mm). Overall fabric thickness for many applications, measured in this manner, is preferably between about 0.07 and 0.15 inch (2 and 4 mm). Some loss of thickness can occur due to pressures applied in lamination or during winding. This may be more evident on lighter weight laminates with less crush resistance. The lamination of the two materials in the manner discussed herein provides a finished product with a relatively uniformly hook-engageable side 32, and a comfortable cut-pile or broken loop side 34. The technical faces of both materials are intimately bonded directly together by discrete, spaced-apart amounts of adhesive that flows into inter-fiber interstices of both fabrics without fouling either the loops 16 or the cut-loop fibers forming the skin contact surface. Furthermore, the hydrophobic-hydrophilic nature of the laminate tends to pull moisture away from surface 34 and toward surface 32, where it evaporates. The nature of the fabric grounds, even with the inclusion of elastomeric yarns as discussed below, results in a very air-permeable product.

Referring back to FIG. 1, first fabric layer 12 is a knit fabric 14 formed primarily of hydrophilic yarns that help pull moisture from inside the laminate, for evaporation from the exposed outer surface of the laminate. An example of such a fabric 14 is a circular knit loop material knitted from three yarns: a 40/13 texturized nylon ground yarn, a 70 denier monofilament spandex ground yarn having an elongation of at least 475 percent at break, and a 70/12 nylon pile yarn. (As used herein, an X/Y description of a yarn signifies a yarn with X total denier and Y filaments, such that the ratio X/Y denotes the denier per filament, or dpf.) The pile and ground yarns are introduced at every feed point, and the spandex ground yarn at every other feed point, with the spandex yarns fed through the same ground feed hole as the nylon ground yarn at every other carrier plate, such that every other row of stitches includes a spandex filament. The spandex yarns can be run into even fewer carriers, such as every third or fourth carrier plate, to produce fabrics of lower elasticity, or into every carrier plate if desired. Pile yarn can also be added every stitch, every other stitch, or as frequently as desired to provide a desired fabric weight and cost.

Figure 3:
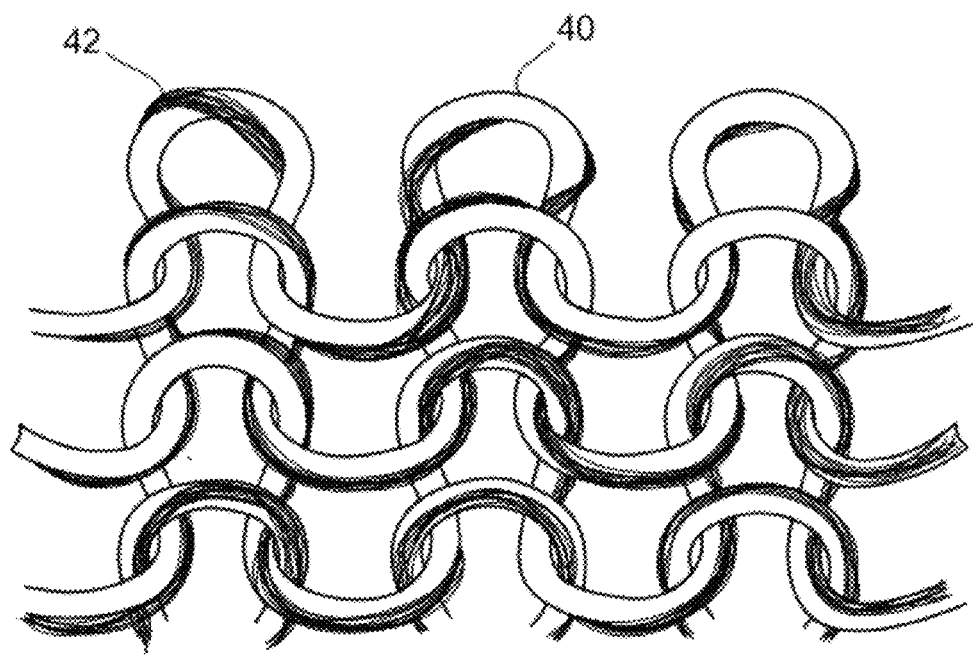
FIG. 3 is a schematic illustration of a knit ground structure.

FIG. 3 illustrates a jersey knit ground structure in which every row of stitches contains both a spandex monofilament 40 and a multi-filament ground yarn 42. The pile yarns are omitted from this illustration, for clarity. This figure illustrates an example of the relation of the non-elastomeric and elastomeric ground yarns as following the same path through the knit but not being plated so as to have the elastomeric yarn always lie on one side of the fabric or the other. Rather, as shown, the yarn positions will shift from front to back throughout the ground, due to movement of the yarns within the carrier plate ground feed hole. Using yarns of similar weights can exacerbate this effect. Heavier weight yarns will tend to migrate to the technical face if mixed with finer weight yarns.

Figure 4:
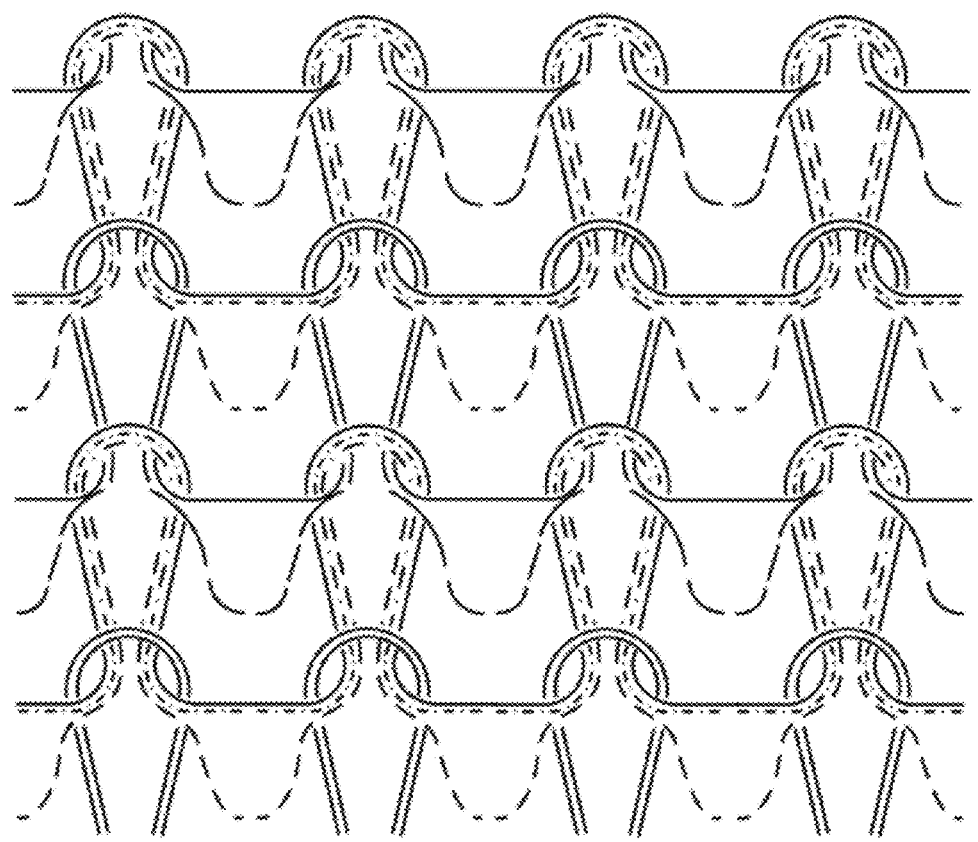
FIG. 4 shows yarn paths through a three yarn knit material, with pile yarn included in every course and an elastomeric ground yarn included in every other course.

FIG. 4 shows the path of each yarn through the knit structure of the fabric, and shows how the pile yarn 44 is knit alongside the spandex 40 and nylon 42 ground yarns, except that the pile yarn 44 is knit over sinkers to form a three-dimensional pile loop extending out of the plane of the ground. The material is knit to 32-34 wales per inch, as finished. Other wale counts can be obtained by changing the machine gauge or by stretching in finishing. As stabilized with an elastic acrylic binder as discussed below, first fabric layer 12 has a basis weight of about 6.9 osy (230 gsm). Although schematically illustrated in FIG. 1 as a flat surface, it can be seen from FIG. 2 that the outer surface of the knit fabric has the characteristic undulations of a knit structure from which the loop fibers extend. The fibers forming loops 16 should be of sufficient strength to function through repeated hook cycling, so that they are not easily broken when engaged with a hook, resulting in an objectionably worn (frayed) appearance. For a long-use (i.e., non-disposable) product the fiber denier should be selected to be much coarser than yarns and fibers used in second fabric layer 20. There are numerous yarn and filament combinations possible, but as a practical matter commercial choices are normally limited to products that are currently available in volume. Yarns as large as 280/14 are commercially available, as well as yarns in then 200/10 range. Commercially available yarns as small as approximately 15/1 (i.e., monofilaments) can be used, and yarns as small as 20/5 are possible. Another particularly suitable pile yarn is a 140/24 nylon. Finer denier fibers can be used if the fibers are of sufficiently high tenacity. Fibers of approximately 4 grams/denier break strength are considered normal tenacity, while fibers of 8 grams/denier or more are considered high tenacity.

The nylon ground yarns are texturized with a false twist texturizing method, such as by heating and twisting the yarns between two surfaces during yarn manufacture. When relaxed, the yarn has substantial bulk and texture, and skein shrinkage of about 46 percent, as measured in accordance with ASTM D4031. Other texturizing methods include friction texturizing, nip twisting, air jet texturizing, knit-de-knit, edge crimping and gear crimping. Excessive texturizing can cause undesired kinking of the yarn. The nylon ground yarn is preferably texturized to skein shrinkage of between about 30 and 55 percent. During knitting, the tension on the texturized ground yarns is limited to maintain a desired level of texture or bulk. In this example the tension maintained on both the nylon and spandex ground yarns is 6 grams. A suitable texturized nylon ground yarn is available from Sapona Manufacturing Company, Inc. of Cedar Falls, N.C., as product code 08020.1. In some cases the pile yarn is also texturized, either to add randomization or density to the pile or to increase the stretchability of the fabric. Texturized pile yarns may require less or no napping for disorientation.

The knit nylon/spandex fabric tube is placed in a pressure vessel and heat set under pressure in the presence of an anionic liquid dye that reacts with amino groups of the nylon to form an ionic bond, the dye penetrating through the nylon to affect its molecular weight. Heat setting and dyeing may also be done at atmospheric pressures.

After heat-setting and dyeing, the knit tube is removed from the pressure vessel, slit open along its length, and treated with a commercial napping lubricant or fabric softener to facilitate napping. The slit fabric is then dried on a tenter frame or drum dryer (or other suitable dryer), and then napped to raise the loops of the pile for better hook engagement properties. Special precautions should be taken to prevent damage to the fabric when brushing or napping, due to the presence of elastomeric yarn. In a brushing or napping operation, if the spandex is contacted by the brush or napper wire, it can be cut or damaged. The knit fabric is then back-coated with a stretchable acrylic applied to the technical face of the product as a foam emulsion that breaks down to wick the acrylic into the ground of the fabric to serve as a binder to stabilize the pile loops for increased pull-out resistance and cycle life. In order to retain the stretch/recovery properties of the fabric, the back coating should be of a material and an application mode that does not significantly hinder stretching the final fabric. Using an elastomeric binder material can in some cases improve the resilience of the fabric even as compared to similarly constructed fabrics without a binder coat. A suitable elastomeric emulsion that can be applied as a foam is HyStretch® V-43, available from Lubrizol Advanced Materials, Inc. of Cleveland, Ohio. The V-43 material is mixed with water at a ratio of 1.6 liters V-43 to 1.0 liters of water in a mixer that foams the mixture by air injection at a volumetric blow ratio of 20 parts air to 1 part liquid. Other blow ratios as low as 3 to 1 are possible, depending on the density of foam desired. The amount of the dispersion applied can be controlled to increase or decrease the coat weight. Also, the mix ratio can be altered to achieve the desired results of binding and tie coating. In some cases where light coating is required, flow rates as low as 0.5 liter/min are applied at a fabric speed of 28 yards/min (25 meters/min). In other cases, flow rates of up to 5.0 liters/min are applied at similar line speeds. In some cases the back-coating is applied at a flow rate of 1.2 to 1.6 liters per minute, while a flow rate of 2.6 liters per minute can provide more bonding.

The binder should be selected to be compatible with the lamination adhesive in order to prevent poor lamination adhesion. Some common back-coating liquids, such as acrylic and urethane binders, can interfere with the bonding of co-polyamide or co-polyester hot melt adhesives. Back coating fabrics using co-polyamide or co-polyester powders may be done in a scatter coat application, resulting in a compatible binder coat that does not dramatically reduce air permeability. In other cases, these powders can be dispersed in a paste and applied in convention coating methods.

Back-coating powders may be dispersed in an acrylic or urethane binder to provide deeper penetration into the fabric than a hot melt. The dispersed powders, because of their larger particle size, tend to filter out and remain on the outside surface of the fabric. In some cases powders are dispersed as one part powder to ten parts binder, and have been found to give an improved bond over straight acrylic or urethanes. The weight percentage of the powder can be increased to 50 percent, or even higher, to improve tie coat results. In some cases powder level can be increased high enough to provide bonding to other surfaces or fabrics when reheated (such as for lamination by iron) without a secondary application of bonding hot melt. In one example, 10 percent co-polyester powder was blended into the acrylic binder and applied as a foam at a rate of 1.6 liters per minute at a line speed of 28 yards/min (25 meters/min). Further details of foam binder coating and fabric finishing can be found in U.S. Pat. No.

6,342,285, the contents of which are incorporated herein by reference. The final added weight percentage of the added binder in the finished fabric is between about 9 and 16 percent.

The binder is applied to the technical face of the fabric, either just before or while the fabric is stretched on a tenter frame and passed through an oven to dry and cross-link the binder before relaxing the fabric. The applied stretch during cross-linking of the acrylic binder is not excessive, and is primarily to hold the fabric taut during stabilization. In one example the fabric is stretched widthwise up to about 15 percent, while being overfed into the tenter as much as 15 to 20 percent in the lengthwise direction, to offset any residual longitudinal tension from prior processing and to prevent loss of elasticity. Tenter frame roll tension is also kept low. A greater amount of stretch during binder setting may increase breathability at some expense of elasticity. The fabric is then dried and heat set on the tenter frame, at a temperature of 320 degrees Fahrenheit (160 degrees C.) for about 35 seconds, then spooled.

This nylon/spandex example of knit fabric 14 has a fabric stretch of 20 to 34 percent, as tested per ASTM 6614-00 CRE method, with a recovery of about 97-98 percent.

Second fabric layer 20 is formed of hydrophobic, microdenier yarns and elastomeric yarns. By 'microdenier yarns' we mean yarns formed of microdenier fibers. In this example, each filament of the yarns is of about 1.0 denier. Fabric layer 20 is a circular knit material, of a basis weight of about 4.8 osy (160 gsm). It is preferable that the non-elastomeric yarn used in this fabric be of very fine fibers in the near-microdenier or microdenier range, making it soft against the skin to improve comfort. It has been discovered that if fibers in these yarns also have irregular cross-sections, such as dogbone or cloverleaf, or are hollow, tiny spaces between or inside the fibers promote capillary action, helping to remove moisture from the skin. Hydrophobic polyester yarns are desirable because of their low moisture content, but nylon fibers, in particular modified nylon or hydrophobic polypropylene fibers, can also be used. Additionally, these fibers may be produced with silver compounds included in the polymer, for anti-microbial properties. By adding these compounds into the fiber, or by topical addition to the finished fabric, bacterial growth can be controlled to reduce infection and prevent odor. In one example the yarns are supplied by Hyosung of Korea, available under the brand name of Aerosilver®. Several yarns and filament counts are available under this brand name. In one example a 70/72 yarn is selected for both the pile yarn and one ground yarn, the other ground yarn being the same 70 denier monofilament spandex yarn as in the example of first fabric layer 12, described above. As in that example, the spandex yarn is fed into the same feed hole as the non-elastomeric ground yarn, in every other carrier plate, such that the spandex and non-elastomeric ground yarns follow the same path in the ground of the knit material but are both present on the technical face of the knit. The non-elastomeric polyester ground yarn is not texturized, but the non-circular Aerosilver® yarns are found to have some resiliency without post-texturization. Another suitable polyester yarn configuration is a 150/144 Aerosilver® or Aerocool® yarn, also available from Hyosung.

The knit polyester/spandex fabric tube is placed in a pressure vessel and heat set under pressure in the presence of a dispersed dye that penetrates into the polyester but forms only a weak hydrogen bond. A reducing agent helps to remove dye from the surface of the polyester, particularly in darker shades. After heat-setting and dying, the knit tube is removed from the pressure vessel, slit lengthwise, dried, and then napped to break the pile fibers to create a surface with a desired effective coefficient of friction to maintain position against skin, for example. No napping lubricant is needed as the intention of the napping is to break the pile. The broken-pile fabric is then pinned on a tenter frame, dried and heat set at a temperature of 320 degrees Fahrenheit (160 degrees C.) for about 35 seconds, and then spooled. In some cases it may also be advantageous to apply a stretch binder coat to the back of the polyester/spandex fabric. While such a coating is not needed to lock in the pile, it can improve the elastic recovery, and provide a cleaner cut edge to the laminate.

In the example described above, second fabric layer 20 is a circular knit fabric, but warp knit fabrics may also be employed. In some examples, first fabric layer 12 is a warp knit fabric and second fabric layer 20 is a circular knit.

Figure 5:
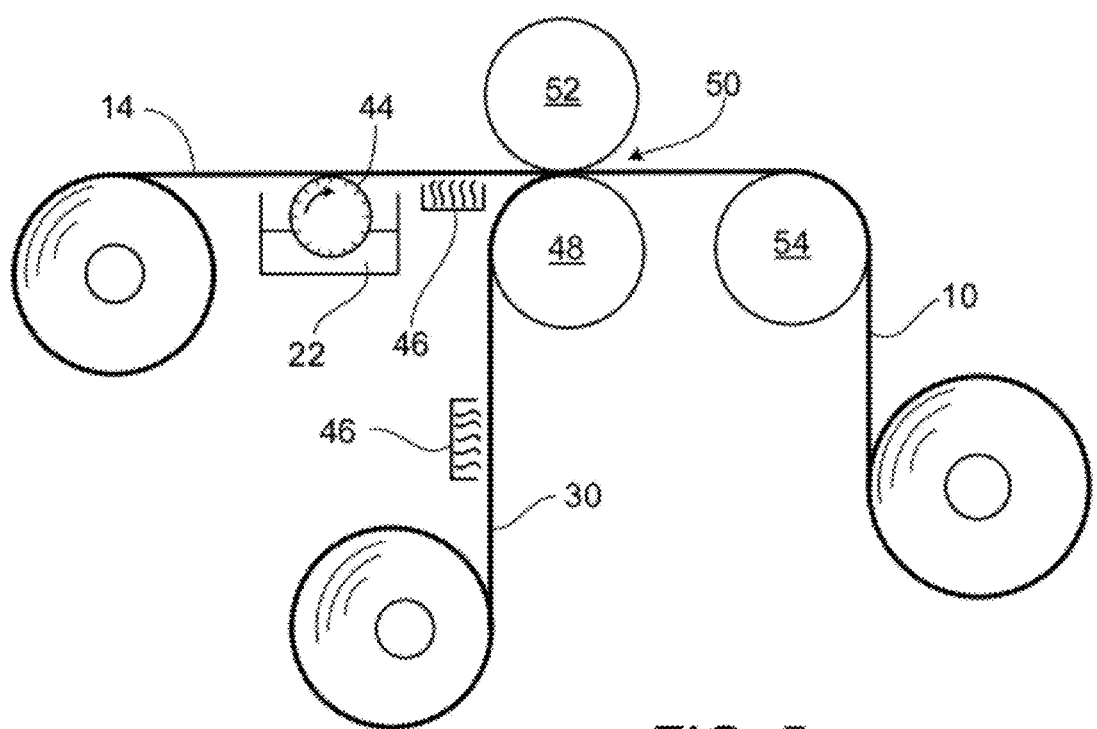
FIG. 5 illustrates a machine and process for forming a fabric laminate from two knit materials.

Referring next to FIG. 5, both knit fabrics 14, 30 are laminated together to produce the finished laminate 10. Hot melt adhesive 22 is applied to the technical face of knit fabric 14 by a gravure printing process. The adhesive is a heat-stabilized co-polyamide resin available from EMS as Griltex® D 1566A. It has a very high melting point, of about 240 to 257 degrees F. (applied at a temperature of 150 degrees C. for decreased viscosity), to enable the laminate to be stable through washing cycles. Alternatively, a co-PA/PET or co-PET resin may also be employed, as can moisture cure adhesives and adhesives other than hot melts. The adhesive is applied as discrete dots, in a pattern resulting in an average distribution of 28 gsm of adhesive, such that the adhesive comprises only about six percent of the final laminate weight. Higher adhesive application weights, such as 57 gsm, may be appropriate for some applications. This glue produces a good bond between two dissimilar surfaces. Other hot adhesives can be employed, such as polyamide, polyester or polypropylene. The technical face of fabric 14 contacts a rotating gravure roller 44 that leaves discrete dots of molten adhesive 22 on the technical face of the fabric, by known gravure printing methods. The technical faces of both fabrics may be heated, such as by infrared heaters 46, just before entering a lamination nip 50 defined between pressure roller 48 and laminating roller 52, where sufficient pressure is applied to form the laminate. Suitable lamination equipment may be obtained from Lacom Vertriebs GmbH Laminating Coating Machines of Lauchheim, Germany.

Gravure roller 44 has an outer surface that defines a pattern of offset or random cavities that each carries an associated, discrete volume of adhesive to the fabric surface. The pattern may comprise dots or lines, for example. With an offset or random dot pattern, adhesive dots are offset or random to distribute the bonding strength evenly. With a linear dot pattern the adhesive dots are arranged in lines, and in delaminating the products this can be felt as a bond-no bond force. The patterned adhesive application creates spaces between the adhesive dots for air to pass. Dot pattern, diameter, density, cavity depth, etc, all influence the percentage of coverage of adhesive on gravure roller 44 and in the final lamination 10. This can also be influenced by the use of a negative or positive doctor blade position. Gravure rollers 44 are available to provide coverage of 10 to 70 percent, and custom patterns are available.

It is possible to improve the adhesive bond while still obtaining a good permeability by changing the depth of the gravure dot cavities. A deeper dot holds more volume of adhesive, and creates a taller mound of adhesive to bridge the spacer layer between the two fabrics being laminated. Cavity depths of 0.06 mm to 0.50 mm are available.

Line speed and temperature are important factors to control the laminate bond strength, particularly with gravure rollers

44 that deposit less adhesive, such as a CP 100 or CP 96 gravure roller. Slower line speeds of approximately 5.0 yds/min (4.5 meters/min) or less can improve the bond with these lower-adhesive rollers. Using gravure rollers 44 that deposit more adhesive, bond strength is increased at higher speeds. Preferably lamination occurs while the adhesive is still somewhat flowable. More gravure adhesive lamination details can be found in pending U.S. patent application Ser. No. 12/750,887, published as US-2010-0247846-A1, the entire contents of which are hereby incorporated by reference.

Following lamination, the laminate is then passed over a chilled roll 54 and the laminate edges may be trimmed in line as the laminate is being wound onto a roll. In some cases, the edge is trimmed in a separate process on suitable equipment designed for this purpose. It is preferred to trim outside edges that do not receive adhesive, and therefore are unbound. The laminate is then spooled for transportation or further processing.

The adhesive may be applied by other means. For example, a web adhesive or apertured film, such as available from DelStar Technologies, Inc. of Middletown, Del., USA can be used. These webs can be formed by a random spray pattern, embossed from a film, or formed on a laminating machine with a gravure roll to form an open web, which can then be fed between the two fabrics into a heated belt laminator. In other cases breathable laminates can be formed by ultrasonically bonding multiple layers of fabric using little or no adhesive in the laminate. Beckmann Converting Inc. of Amsterdam, N.Y., USA is capable of doing such ultrasonic lamination. Another means is scatter or powder coating, in which a hot-melt resin is sprinkled on a moving web as a powder, heated to melt the resin, and then nipped with the other fabric to bond the web and fabric together to form the laminate. In some cases, when adhesive is applied by any method, such as gravure, powder, spray, or web adhesive film, the two fabrics are compressed together with light pressure with heat on a belt laminator, so as to provide bonding without crushing surfaces of sensitive fabrics.

Mechanical methods of securing the two fabrics together, as an alternative to, or in addition to, adhesive, include needling or stitch-bonding the two fabrics together. Ultrasonic heat staking is another bonding means, which can create a quilted surface.

Laminate 10, as formed, preferably has a basis weight of less than about 20 osy (675 gsm), or in a range of 10 to 20 osy (335 to 675 gsm). One example had a basis weight of 17.5 osy (590 gsm). Adhesive lamination bond strength can also be measured on an Instron tester in accordance with the ASTM D 2724-03 test method.

Laminate 10, as formed, preferably has an air permeability, measured in accordance with ASTM D737-04, of at least 40 cfm per square foot (12 meters/min), more preferably at least 75 cfm per square foot (22 meters/min). Air permeability may be measured on a Frazier Air Permeability Instrument, model FAP-HP, supplied by Frazier Precision Instruments Co Inc. of Hagerstown, Md., USA.

Laminate 10 is fashioned to have significant in-plane resilience or stretchiness, in both machine and cross-machine directions, due in part to the inclusion of elastomeric fibers or yarns to both fabrics. Such fibers may be formed of a polyurethane polymer known as elastane or spandex. Spandex is extruded as a monofilament in round or shaped cross-section, and is available as a multifilament with a denier as low as 15. Increasing the denier of the spandex increases the "power" of elastic recovery. In some medical applications like elastic bandages, more power is desired to provide compression in the bandage.

Laminate 10 is also configured to provide particularly high friction coefficients at the skin contact surface, while at the same time providing a non-tacky, fibrous skin contact surface. In the case of medical textiles that are worn in direct contact with the skin, higher coefficients of friction help the material to stay in place as the wearer moves, while the material itself should be soft enough to prevent dermal abrasion. By "kinetic friction coefficient" and "static friction coefficient" I mean the friction coefficients as determined in accordance with ASTM D1894-01, with the laminate secured to a rigid surface such that the skin contact surface of the laminate is facing upward for direct contact with the 63 mm by 63 mm square underside of the 200 gram sled, which is of stainless steel and has an underside surface roughness of 15-18 micro-inch (0.40-0.45 µm). Using that method, one example of the laminate discussed above exhibited a static friction coefficient of about 0.42, and a kinetic friction coefficient (with the sled pulled across the laminate at a constant speed of 150 mm/min) of about 0.36. Preferably, the laminate has a static friction coefficient of at least 0.4, and a kinetic friction coefficient of at least 0.25, or in some cases at least 0.3.

In an example of a disposable, three-part laminate (not illustrated), an elastomeric core, such as a stretchable non-woven or knit fabric or scrim or porous film, is laminated between a skin-friendly material of hydrophobic and antimicrobial properties, and a hook-engageable fabric. A lightweight, hook-engageable material is laminated to the opposite side of the stretchable core layer. As with the two-part laminate discussed above, sufficient adhesive may be applied to a given, discrete area to cause the adhesive to penetrate through the core and directly bond the outer fabric layers to one another.

Figure 6:
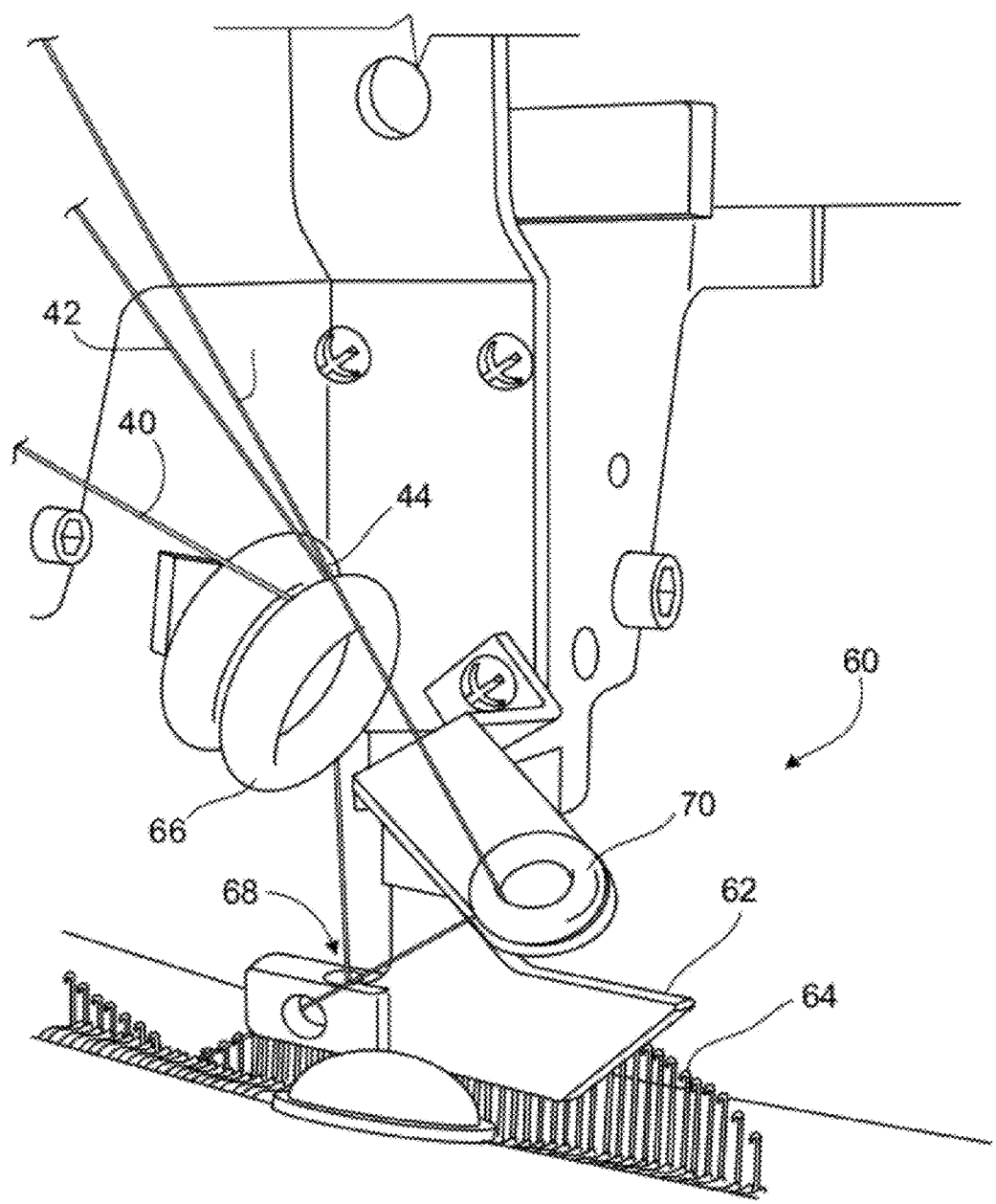
FIGS. 6 and 7 show a yarn feeder assembly in use in a circular knitting machine.
Figure 7:
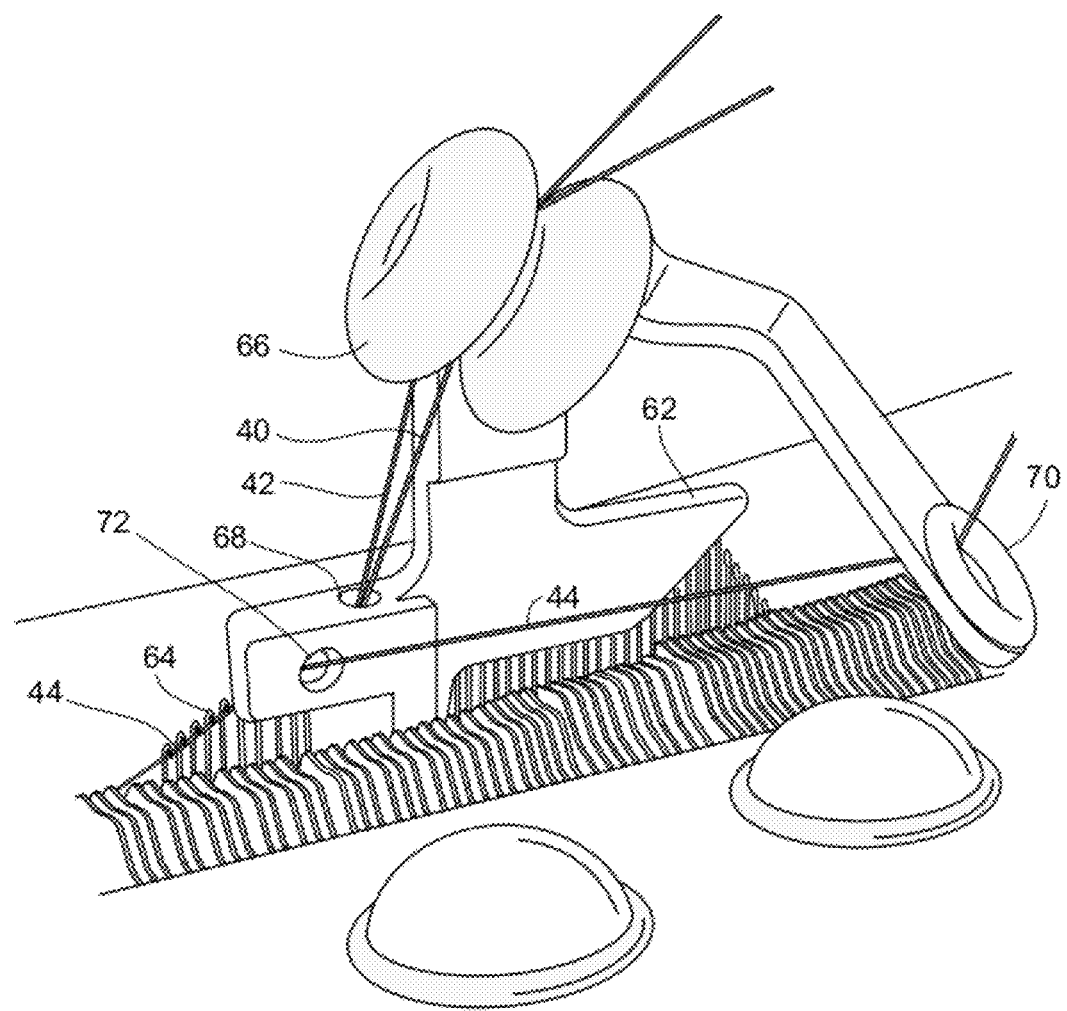
Figure 8:
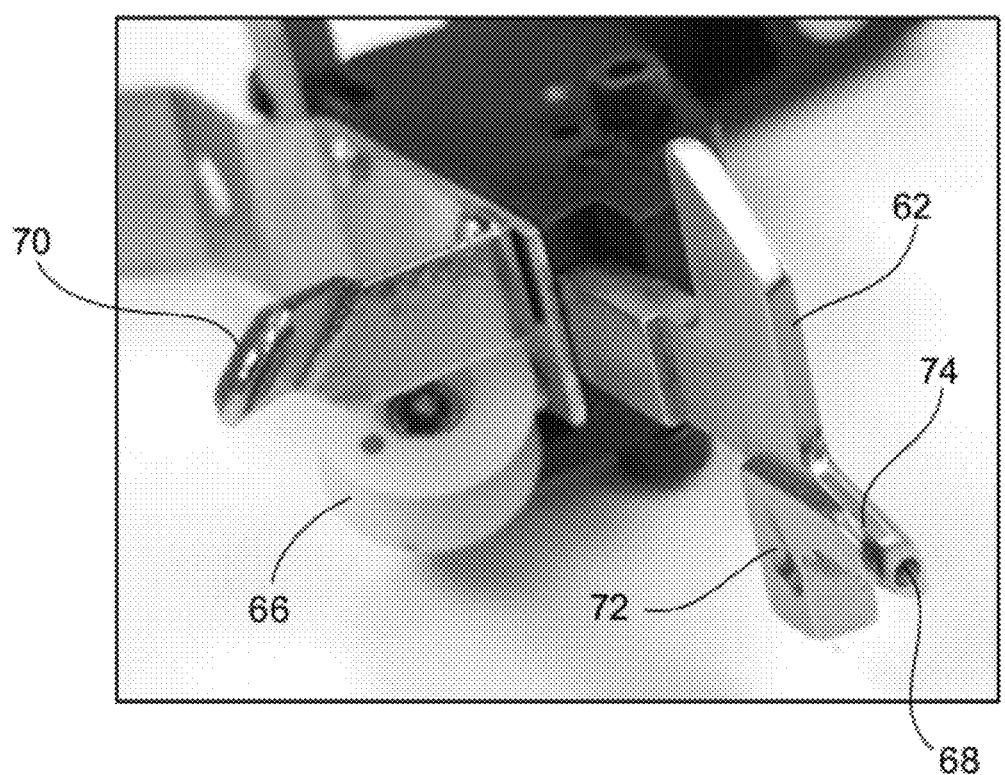
FIG. 8 shows a yarn feeder assembly as viewed from below.

The stretchable knit pile fabrics discussed above may be knit on a standard circular knitting machine equipped to feed the three distinct yarns from different spools. FIGS. 6 and 7 show one of a series of yarn carrier assemblies spaced about the rim of a circular knitting machine on which the fabric is formed. The carrier assembly 60 carries a yarn carrier plate 62 that receives the three yarns from their respective spools (not shown) via positive yarn storage feeders, and directs them sequentially to a series of needles 64 that are raised by a cam system with respect to the carrier plate. The ground yarns (elastomeric yarn 40 and texturized non-elastomeric yarn 42) are separately fed to a single ground yarn feed roller 66, where they are joined and fed into a ground feed hole 68 in the top surface of the carrier plate. Pile yarn 44 is fed through a grommet 70 and into a pile yarn feed hole 72 in the side surface of the carrier plate. While the two ground yarns emerge together from ground feed hole 68 at the bottom of the foot of the carrier plate (see FIG. 8), the pile yarn 44 passes out the back side of the carrier plate and is knit into the material over a series of sinkers (not shown) to form the pile.

The elastomeric and non-elastomeric ground yarns are not normally joined in the carrier plate in typical stretch jersey knit materials. Rather, the elastomeric yarn is typically fed into a separate groove 74 that runs down the foot of the carrier plate (see FIG. 8) in this style of carrier plate, such that at the lower end of the carrier plate foot the two ground yarns exit always with a fixed relative positioning, with the result that the non-elastomeric yarn is consistently placed on the technical face of the fabric, while the elastomeric yarn will be generally trapped between the technical face yarn and the pile yarn. Because in this example the two ground yarns are fed through the same feed hole, they will tend to shift in their relative positioning during knitting, with the non-elastomeric yarn occasionally lying on the technical face, and the elastomeric yarn occasionally lying on the technical face. Because of this knitting method, both ground yarns will be present on the technical face, as illustrated in FIG. 3.

By changing yarn position between hole and slot, the elastomeric yarn can be either positioned to be covered by the non-elastomeric yarn or positioned to be more exposed on the technical face of the knit fabric. By placing the elastomeric yarn in the slot, it will tend to be covered by the non-elastomeric yarn. If the elastomeric yarn is placed in the hole and the non-elastomeric yarn is placed in the slot, more of the elastomeric yarn will plait to the technical face. Carrier plates of Mayer knitting machines do not use a slot, but instead have 2 holes.

Feeding the elastomeric yarn through groove 74 will cause the elastomeric yarn to be exposed on the technical face in greater proportion than the non-elastomeric yarn. This may be particularly useful in laminating two such fabrics together with an adhesive that bonds two elastomeric surfaces together well. It may be that some urethane or acrylic adhesives will have better chemical affinity with a segmented polyurethane spandex surface, for example, than with a nylon or polyester surface, thereby efficiently and permanently bonding such spandex-backed materials together to form a laminate. Development of a strong chemical bond with the adhesive may help to reduce the bonding surface area required for reliable lamination, further increasing the obtainable air permeability of the laminate.

Figure 9:
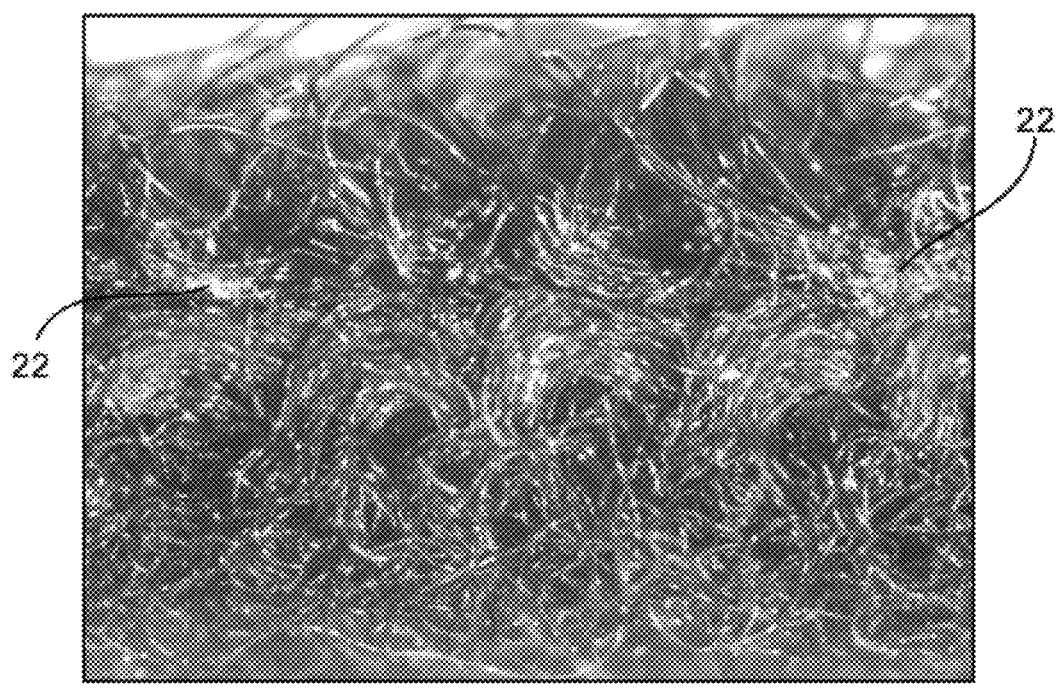
FIG. 9 is a highly enlarged side view of a laminate, showing discrete amounts of adhesive bonding two knit fabrics together.

FIG. 9 shows how little adhesive may be necessary to effectively bond together two fabrics knit to have both elastomeric and non-elastomeric yarns exposed on their technical backs. In this enlarged side photograph, two discrete adhesive bonds are visible, corresponding to two discrete dots of adhesive applied by gravure printing during lamination, as discussed above. The adhesive shows up as lighter regions in the photograph, with one visible near the left of the photograph between the ground layers, and one near the right of the photograph. The adhesive is in intimate contact with, and encapsulates portions of, fibers of the technical faces of both fabrics.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of forming a circular knit fabric, the method comprising
    feeding a multi-filament non-elastomeric yarn from a first spool into an aperture defined in a yarn carrier plate that guides the non-elastomeric yarn sequentially to a series of knitting needles spaced about a circular needle array; while
    feeding an elastomeric yarn from a second spool to the yarn carrier plate, such that a fabric is knit to have a ground comprising both the non-elastomeric yarn and the elastomeric yarn;
    wherein the non-elastomeric yarn and the elastomeric yarn are fed together into the carrier plate aperture in an untwisted, unwrapped relation, such that the fabric ground is knit to have a technical face in which portions of the non-elastomeric yarn are exposed in some areas and portions of the elastomeric yarn are exposed in some areas.

2. The method of claim 1, further comprising feeding a pile yarn from a third spool into a pile yarn aperture defined in the carrier plate, such that the pile yarn is delivered to the knitting needles to form a pile extending from a technical back of the knit fabric.

3. The method of claim 1, wherein the non-elastomeric yarn comprises a texturized yarn.

4. The method of claim 1, wherein the elastomeric yarn comprises a non-wrapped yarn.

5. The method of claim 1, further comprising applying a stretchable binder to the knit fabric ground.

6. The method of claim 1, further comprising adhesively laminating the technical face of the knit ground of the fabric to a technical face of another fabric.

7. The method of claim 6, wherein the other fabric has a technical face at which elastomeric yarn is present.

8. The method of claim 6, wherein adhesively laminating the technical face of the knit ground comprises applying a stretchable acrylic adhesive to the technical face of the knit ground.

9. The method of claim 8, wherein the adhesive is applied to cover no more than about 70 percent of an area of the knit ground.

* * * * *